United States Patent [19]

Mueller et al.

[11] B 3,994,680

[45] Nov. 30, 1976

[54] TEXTILE PRINT PASTES CONTAINING DISPERSE DYES

[75] Inventors: Richard Mueller; Rolf Fikentscher; Guenter Meyer; Knut Oppenlaender, all of Ludwigshafen, Germany

[73] Assignee: BASF Aktiengesellschaft, Ludwigshafen (Rhine), Germany

[22] Filed: Sept. 19, 1974

[21] Appl. No.: 507,476

[44] Published under the second Trial Voluntary Protest Program on February 10, 1976 as document No. B 507,476.

[30] Foreign Application Priority Data
Oct. 1, 1973 Germany............................ 2349229

[52] U.S. Cl............................................. 8/62; 8/63; 8/87; 252/8.8
[51] Int. Cl.². ........................................... D06P 1/16
[58] Field of Search................ 8/62, 63, 87; 252/8.8

[56] References Cited
UNITED STATES PATENTS 3,223,471  12/1965  Kuth et al. ................................. 8/87
3,844,710  10/1974  Reinhandt et al. ........................ 8/62

Primary Examiner—M. J. Welsh
Attorney, Agent, or Firm—Johnston, Keil, Thompson & Shurtleff

[57] ABSTRACT

A print paste for printing textiles of polyester, cellulose acetate, cellulose triacetate and mixtures of the same with other fibers which is based on a disperse dye, thickener, ethanolamide of a carboxylic acid and water and which is characterized by a content of at least one phenol which has been oxyethylated twice to six times. The paste yields prints having excellent color strength and levelness.

4 Claims, No Drawings

TEXTILE PRINT PASTES CONTAINING DISPERSE DYES

The invention relates to print pastes containing disperse dyes and which are suitable for printing textiles of polyesters, cellulose acetate, cellulose triacetate and mixtures of the same with other fibers.

It is known that disperse dyes may be used for printing fibrous material particularly of polyesters, cellulose acetate and cellulose triacetate. To improve depth of color certain fixing auxiliaries are added to the pastes and the prints are fixed by steam or hot air. Many auxiliaries of varying chemical constitution have been recommended. It spite of the multiplicity of such products it has been found that they do not adequately fulfill the various requirements placed upon them in practice.

Thus it has been found that the group of water-soluble fixing auxiliaries are without problems as regards their use in aqueous print paste systems but their main purpose, i.e. improving the depth of color, is fulfilled inadequately if at all. On the other hand accelerators having excellent deepening effect on color are to be found in the group of products which are sparingly soluble or insoluble in water. These however often cause considerable disturbances in production as for example smearing of the doctor knife, obstruction of the screen and the like. This results in useless products due to staining, defective levelness, spot formation or similar phenomena. For this reason it is necessary to stop the machinery at frequent intervals to clean the printing equipment. Another disadvantage of many products is their great volatility so that (a) they disappear on drying or (b) they soil the drying unit and this results in rejects and stoppages.

The most effective products as regards increasing depth of color include the reaction products of long chain fatty acids with alkanolamides which are essentially non-volatile. They have however the abovementioned disadvantages of products which are insoluble or difficult to disperse in water.

It is an object of the invention to provide a print paste which makes the use of alkanolamides in print pastes more reliable and brings out their advantageous effect of deepening color not only on polyesters but also on cellulose acetate and cellulose triacetate to a satisfactory extent.

We have found that the said difficulties as regards flow properties and levelness of the prints can be avoided with good color strength and moreover a better color-deepening effect on triacetate by using a print paste for textile material consisting essentially of a polyester, cellulose acetate and/or cellulose triacetate a print paste which contains at least one disperse dye, at least one thickener, and at least one ethanolamide of a carboxylic acid of 12 to 24 carbon atoms and water and also, this being the essential feature of the invention, at least one phenol which has been oxyethylated from twice to six times.

Phenols to be oxyethylated for use in print pastes according to the invention are preferably mononuclear or binuclear phenols or bisphenols of a molecular weight of up to 250; examples of suitable binuclear bisphenols are those in which the bridge is provided by a methylene or isopropylene group. Examples of simple phenols are phenol itself and its methylated, ethylated, n-propylated, isopropylated, n-butylated and tert.-butylated homologs and also chlorophenols and bromophenols as well as naphthols. It is preferred to use phenol, monochlorophenol which may contain the chlorine atom in the o-position or the p-position, 2,4-dichlorophenol, m-cresol, p-cresol and — of special interest — p-tert.-butylphenol and p-isopropylphenol. Bis-p-hydroxyphenyl-2,2-propane is a particularly suitable binuclear bisphenol.

The said phenols are oxyethylated from twice to six times and preferably from three to five times. At lower degrees of oxyethylation there is observed a worsening in the flow properties (clogging of the stencil, coating of the doctor knife, spot formation) and at higher degrees of oxyethylation there is a more marked decline in depth of color so that in both cases less useful products result.

The oxyethylation products may be obtained in conventional manner by alkaline-catalyzed reaction of the phenols in ethylene oxide at elevated temperatures and superatmospheric pressures. They may be characterized in conventional manner by hydroxyl numbers of their degree of oxyethylation.

In many cases mixed oxyethylated phenols may be particularly favorable.

Another essential component of the print paste is the said carboxylic ethanolamide, which may be a monoethanolamide or a diethanolamide and which in combination with the oxyethylated phenol produces an excellent depth of color of the print, the processability being unaffected. The ethanolamides are derived from fatty acids of 12 to 24 carbon atoms and preferably 15 to 18 carbon atoms in the fatty alkyl radical, or also from their derivatives such as the hydroxy-fatty acids, or for example from reaction products of fatty acids with sarcosine, particularly from oleyl sarcoside. Examples of suitable monoethanolamides and diethanolamides are those of oleic acid, stearic acid, rape seed oil fatty acid, tall oil fatty acid, ricinoleic acid, hydroxystearic acid, behenic acid, erucic acid, soya ben oil fatty acid, palm kernel oil fatty acid and preferably mixtures of the said acids. The monoethanolamides and diethanolamides of monounsaturated acids such as oleic acid, tall oil fatty acid and ricinoleic acid or mixtures of the same are particularly preferred.

The print pastes contain a conventional thickener, particularly suitable examples of which are carob bean flour ether, starch ethers and alginates. The thickening agent generally consists of an about 10% aqueous solution of the said substances.

The print pastes conveniently contain (per 1000 parts of paste) from about 20 to 80 parts by weight of a disperse dye for example those set out in the Colour Index under this name, from 1 to 30 and preferably from 3 to 10 parts by weight of the oxyethylated phenol to be used according to the invention, from 5 to 30 and preferable from 10 to 20 parts by weight of the ethanolamide and from 500 to 800 parts by weight of thickening agent. They may also contain up to 20 parts by weight of conventional auxiliaries such as oxidizing agents of organic or inorganic origin, acid-reacting agents or antifoam agents, for example from 10 to 20 parts by weight of oxidizing agent such as m-nitrobenzene, sodium sulfonate, small amounts of difficulty volatile organic acids such as citric, tartaric or glycolic acid for setting up the optimum pH. The remainder is water to make up to 1,000 parts by weight. Particularly outstanding results are obtained when there is added to the print paste according to the invention an alkylphenol of eight to 12 carbon atoms in the alkyl group which has been oxyethylated from 10 to 20 times and preferably from 12 to 16 times in an amount of from 0.1 to 0.4% by weight based on the whole of the print paste.

Print pastes according to the invention are applied to the cloth and prints are thus prepared by printing the fibrous material with the paste, optionally drying the printed material and treating it with steam, hot air or infrared radiation at temperatures of from about 100° to 210°C so that the prints are fixed. The printed materials are then rinsed hot or cold and/or reductively cleansed.

The new print pastes give prints having excellent color strength and levelness on polyesters, cellulose acetate and cellulose triacetate without the disadvantages described above, for example spot formation, clogging of the screen and the like having to be taken into account.

The following Examples illustrate the invention.

EXAMPLE 1

A cellulose triacetate cloth is printed by rotary screen printing with a paste which contains 45 parts of the blue disperse dye C.I. No. 61,115, 15 parts of oleic diethanolamide, 10 parts of the adduct of 3.5 moles of ethylene oxide to m-cresol, 230 parts of water and 700 parts of an aqueous thickening agent of 10% starch ether solution and 8% locust bean ether gum (ratio by weight: 1:2). The printed material is dried and treated for seven minutes at 175° with hot steam, then rinsed with cold water, and treated hot in the conventional manner with 2 g/l of caustic soda solution (50%) and 2 g/l of sodium dithionite for reductive cleansing, rinsed cold and dried.

A blue print having excellent levelness and depth of color is obtained even after prolonged periods of running the printing machine.

EXAMPLE 2

Cellulose triacetate cloth is printed with a paste of 40 parts of the yellow disperse dye C.I. No. 12,790, 20 parts of tall oil fatty acid diethanolamide, 10 parts of phenol oxyethylated four times, 5 parts of sodium m-nitrobenzene sulfonate as oxidizing agent to prevent reductive dye destruction, 210 parts of water and 715 parts of a 10% locust bean ether gum thickening agent. The printed material is dried and treated for 1 minute at 190°C with hot air, treated hot in a conventional reducing liquor, rinsed cold and dried.

A blue print is obtained which is satisfactory in depth of color and levelness even after a prolonged running time.

EXAMPLE 3

A cellulose acetate cloth is printed by machine printing with a paste of 70 parts of the orange disperse dye C.I. No. 26,080, 10 parts of the monoethanolamide of hydroxystearic acid, 10 parts of 4,4'-dihydroxyphenylpropane which has been oxyethylated five times, 5 parts of citric acid to adjust the pH, 255 parts of water and 650 parts of a thickening agent of a 10% starch ether solution and a 10% alginate solution, the ratio of starch ether: alginate solution being 1:2.

The printed material is treated for 15 minutes at 102°C with steam so that the print is fixed. The cloth is then rinsed with cold and with hot water, rinsed cold and then dried.

A level intense red print is obtained without any disturbance in a prolonged period of running the printing machine.

EXAMPLE 4

A polyester cloth is printed by rotary screen printing with a paste of 50 parts of the violet disperse dye C.I. No. 62,030, 15 parts of oleic diethanolamide, 4 parts of p-tert.-butylphenol which has been oxyethylated four times, 2 parts of isononylphenol which has been oxyethylated 14 times, 231 parts of water and 700 parts of a 10% starch ether alginate thickening agent (1:2). The printed material is dried in a drying loft at a temperature of from 120° to 150°C and treated for 7 minutes at 180°C with superheated steam. It is then rinsed with cold water, treated hot in a reducing liquor (as usual and as described in Example 1), again rinsed cold and dried.

A blue print is obtained having excellent levelness and outstanding depth of color even after the printing machine has been running for prolonged periods. When oleic diethanolamide is used alone the doctor knife is soiled after a fairly short printing period and the screen is partly clogged so that to avoid an entirely inadequate quality of printing the process has to be interrupted prematurely and an expensive cleaning operation has to be carried out.

We claim:

1. A print paste for textile material consisting essentially of a polyester, cellulose acetate, cellulose triacetate and mixtures of the same which contains, in 1000 parts by weight of paste:
   a. from 20 to 80 parts by weight of a disperse dye;
   b. from 3 to 10 parts by weight of a twofold to sixfold oxyethylated phenol selected from the group consisting of mononuclear and binuclear phenols and bisphenols having a molecular weight of up to 250;
   c. from 5 to 30 parts by weight of an ethanolamide of a carboxylic acid of twelve to twenty-four carbon atoms;
   d. from 500 to 800 parts by weight of a thickening agent; and
   e. water to make up the paste to 1,000 parts by weight.

2. A print paste as claimed in claim 1 which additionally contains from 0.1 to 0.4% by weight of a tenfold to sixteenfold oxyethylated alkylphenol of eight to twelve carbon atoms in the alkyl group.

3. A print paste as claimed in claim 1 which further contains from 0 to 20 parts by weight of an auxiliary selected from a group consisting of oxidizing agents, acidreacting agents, and anti-foam agents.

4. A print paste as claimed in claim 2 which further contains from 0 to 20 parts by weight of an auxiliary selected from a group consisting of oxidizing agents, acidreacting agents, and anti-foam agents.

* * * * *